(12) United States Patent
Zhu et al.

(10) Patent No.: US 11,061,385 B2
(45) Date of Patent: Jul. 13, 2021

(54) METHOD, APPARATUS AND SYSTEM FOR CONTROLLING DEVICE

(71) Applicants: Gree Electric Appliances (Wuhan) Co., Ltd, Hubei (CN); Gree Electric Appliances, Inc. of Zhuhai, Guangdong (CN)

(72) Inventors: Yunfa Zhu, Guangdong (CN); Jiangshan Zhang, Guangdong (CN); Haiying Xian, Guangdong (CN)

(73) Assignees: Gree Electric Appliances (Wuhan) Co., Ltd, Wuhan (CN); Gree Electric Appliances, Inc. of Zhuhai, Zhuhai (CN)

( * ) Notice: Subject to any disclaimer, the term of this patent is extended or adjusted under 35 U.S.C. 154(b) by 0 days.

(21) Appl. No.: 16/628,771

(22) PCT Filed: Aug. 21, 2018

(86) PCT No.: PCT/CN2018/101530
§ 371 (c)(1),
(2) Date: Jan. 6, 2020

(87) PCT Pub. No.: WO2019/085597
PCT Pub. Date: May 9, 2019

(65) Prior Publication Data
US 2020/0257274 A1    Aug. 13, 2020

(30) Foreign Application Priority Data
Nov. 2, 2017  (CN) .......................... 201711069049.2

(51) Int. Cl.
*G05B 19/418* (2006.01)
*G06F 9/445* (2018.01)

(52) U.S. Cl.
CPC ..... *G05B 19/4186* (2013.01); *G05B 19/4183* (2013.01); *G05B 19/41855* (2013.01); *G06F 9/44505* (2013.01)

(58) Field of Classification Search
CPC ............ G05B 19/4186; G05B 19/4183; G05B 19/41855; G05B 2219/2642; G05B 15/02;
(Continued)

(56) References Cited

U.S. PATENT DOCUMENTS 9,271,141 B1 * 2/2016 Egeler ..................... H04W 4/02
RE48,447 E * 2/2021 Kozuka ................... G06F 3/017
(Continued)

FOREIGN PATENT DOCUMENTS

CN         202615224 A      12/2012
CN         103513579 A      1/2014
(Continued)

*Primary Examiner* — Hien D Khuu
(74) *Attorney, Agent, or Firm* — McAndrews, Held & Malloy, Ltd.

(57) ABSTRACT

A method, an apparatus and a system for controlling a device are provided. The method includes that: a user terminal selects a first device from multiple devices, determines the first device as a controller, select a second device from the plurality of devices, associate the second device with the controller to obtain an association relationship, and sends a control instruction to the first device, so as to make the first device control, according to the association relationship, the second device to complete an operation corresponding to the control instruction.

11 Claims, 5 Drawing Sheets

(58) Field of Classification Search
CPC ............ G05B 13/0265; G06F 9/44505; H04L 12/2809; Y02P 90/02
USPC ....................................................... 700/275
See application file for complete search history.

(56) References Cited

U.S. PATENT DOCUMENTS

| | | | |
|---|---|---|---|
| 2002/0073183 A1* | 6/2002 | Yoon | H04L 12/2803 709/220 |
| 2014/0118120 A1* | 5/2014 | Chen | G08C 17/02 340/12.5 |
| 2014/0167935 A1 | 6/2014 | Eden | |
| 2017/0099357 A1* | 4/2017 | Haupt | H04L 65/1023 |
| 2017/0142249 A1* | 5/2017 | Shinar | H04L 12/282 |
| 2017/0208604 A1* | 7/2017 | Kuo | H04W 4/025 |
| 2018/0332158 A1* | 11/2018 | Seo | H04M 1/725 |

FOREIGN PATENT DOCUMENTS

| | | |
|---|---|---|
| CN | 105765899 A | 7/2016 |
| CN | 106054629 A | 10/2016 |
| CN | 106325250 A | 1/2017 |
| CN | 108089559 A | 5/2018 |

* cited by examiner

METHOD, APPARATUS AND SYSTEM FOR CONTROLLING DEVICE

CROSS-REFERENCE TO RELATED APPLICATIONS

This application is a 371 of International Patent Application No PCT/CN2018/101530, filed Aug. 21, 2018, which claims benefit of Chinese Patent Application No. 201711069049.2, filed to China Patent Office on Nov. 2, 2017, entitled "Method, Apparatus and System for Controlling Device" contents of both of which are hereby incorporated by reference their entirety.

TECHNICAL FIELD

The present disclosure relates to the field of Artificial Intelligence (AI), and in particular to a method, an apparatus and a system for controlling a device.

BACKGROUND

Along with rapid development of science and technology, a smart home has been widely applied to daily lives of people. For example, a user in a company controls starting, stopping and the like of an air conditioner at home, thereby facilitating lives of the people.

However, when controlling multiple smart home devices at present, an additional controller is to be taken as a control center. For example, the air conditioner, a curtain, an illuminating lamp and the like are connected with one additional controller, the user sends a control instruction to the controller through a user terminal, and the controller sends the control instruction to a corresponding smart device. While the additional controller undoubtedly increases cost of the smart home used by the user, and all smart devices in the smart home do not achieve true integration.

As to the problem that the integration of the smart devices does not be achieved since an additional controller is taken as the control center to control the multiple smart devices, no effective solution has been provided yet at present.

SUMMARY

At least some embodiment of the present disclosure provide a method, an apparatus and a system for controlling a device, so as at least to partially solve a technical problem that integration of smart devices does not be achieved since an additional controller is taken as a control center to control the multiple smart devices.

In an embodiment of the present disclosure, a method for controlling a device is provided, and the method includes the following steps. A user terminal selects a first device from multiple devices and determines the first device as a controller. The user terminal selects a second device from the multiple devices and associates the second device with the controller to acquire an association relationship. And the user terminal sends a control instruction to the first device, so as to make the first device control, according to the association relationship, the second device to complete an operation corresponding to the control instruction.

In another embodiment of the present disclosure, an apparatus for controlling a device is further provided, including: a determination component, configured to select a first device from multiple devices and determine the first device as a controller; an association component, configured to select a second device from the multiple devices and associate the second device with the controller to acquire an association relationship; and a sending component to send a control instruction to the first device, so as to make the first device control, according to the association relationship, the second device to complete an operation corresponding to the control instruction.

In another embodiment of the present disclosure, a system for controlling a device is further provided, including: multiple devices, a user terminal, which is in communication connection with the multiple devices, and configured to select a first device from the multiple devices, determine the first device as a controller, select a second device from the multiple devices and associate the second device with the controller to acquire an association relationship, and send a control instruction to the first device, so as to make the first device controls the second device according to the association relationship to complete an operation corresponding to the control instruction.

In another embodiment of the present disclosure, a storage medium is further provided. The storage medium may include a stored program. The stored program implements the method for controlling the device as mentioned above.

In another embodiment of the present disclosure, a processor is further provided. The processor is configured to run a program. The program implements the method for controlling the device as mentioned above when running.

In at least some embodiment of the present disclosure, with a machine learning mode, the user terminal selects the first device from the multiple devices, determines the first device as the controller, selects the second device from the multiple devices, associates the second device with the controller to acquire the association relationship, and sends the control instruction to the first device, so as to make the first device control, according to the association relationship, the second device to complete the operation corresponding to the control instruction. A purpose of saving cost of mounting the smart device is achieved, in this way, a technical effect of the integration of the smart device is achieved, and accordingly the technical problem that the integration of the smart devices does not be achieved since the additional controller is taken as the control center to control the multiple smart devices is solved.

BRIEF DESCRIPTION OF THE DRAWINGS

The accompanying drawings described herein are used for providing a further understanding of the present disclosure, and constitute a part of the present disclosure, and exemplary embodiments of the present disclosure and the description thereof are used for explaining the present disclosure, but do not constitute improper limitations to the present disclosure. In the drawings.

DETAILED DESCRIPTION

In order to make the solutions of the present disclosure better understood by those skilled in the art, the technical solutions in the embodiments of the present disclosure will be clearly and completely described below in combination with the drawings in the embodiments of the present disclosure. It is apparent that the described embodiments are not all embodiments but part of embodiments of the present disclosure. All other embodiments obtained by those of ordinary skill in the art on the basis of the embodiments in the present disclosure without creative work shall fall within the scope of protection of the present disclosure.

It is to be noted that terms "first", "second" and the like in the specification, claims and drawings of the present disclosure are adopted not to describe a specific sequence but to distinguish similar objects. It should be understood that data used in such a way may be exchanged under appropriate conditions, in order that the embodiments of the present disclosure described here may be implemented in a sequence other than sequences graphically shown or described here. In addition, terms "include" and "have" and any transformation thereof are intended to cover nonexclusive inclusions. For example, a process, a method, a system, a product or a device including a series of operations or elements is not limited to the operations or elements which are expressly listed, but may alternatively further include operations or elements which are not expressly listed or alternatively further include other operations or elements intrinsic to the process, the method, the product or the device.

Embodiment One

In an embodiment of the present disclosure, a method for controlling a device is provided. It is to be noted that steps shown in a flowchart of a drawing may be implemented in a computer system, for example, of a group computer executable instructions. In addition, although the flowchart shows a logic order, the steps shown or described may be implemented in a sequence other than sequences shown or described here in some cases.

Figure 1:
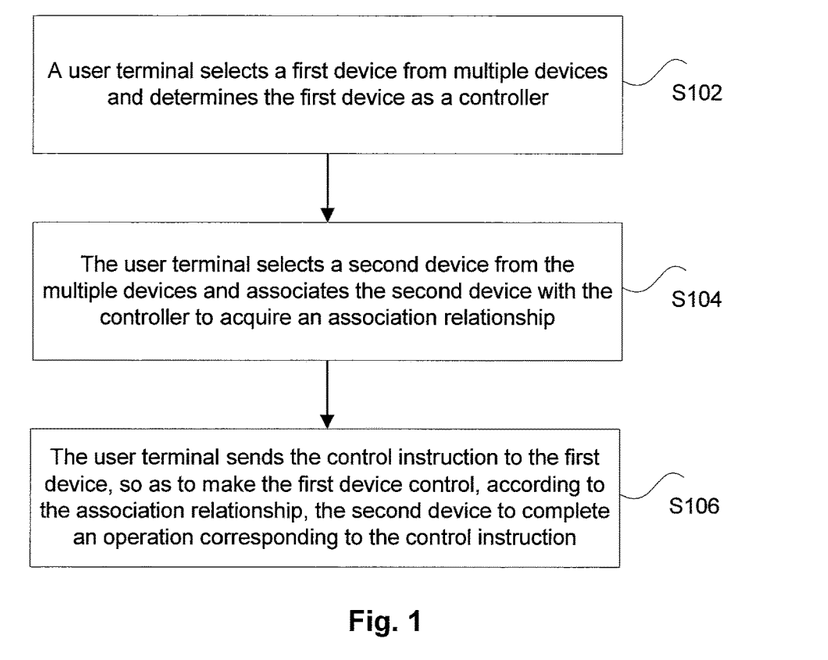
FIG. 1 is a flowchart of a method for controlling a device according to an embodiment of the present disclosure.

FIG. 1 is a flowchart of a method for controlling a device according to an embodiment of the present disclosure. As shown in FIG. 1, the method includes the following steps.

At Step S102, a user terminal selects a first device from multiple devices and determines the first device as a controller.

It is to be noted that the abovementioned user terminal may be, but is not limited to, a smartphone, a tablet Personal Computer (PC), a computer and a wearable device, such as a smart bracelet and a smartwatch. The abovementioned multiple devices may be, but is not limited to, a smart device in a smart home, such as an air conditioner, an illuminating lamp, a curtain, a refrigerator and an electric rice cooker. In addition, there are multiple first devices as the controllers. For example, the air conditioner is selected as the controller. One air conditioner does not control the multiple smart devices synchronously, therefore multiple air conditioners are configured as the controllers to control the corresponding smart devices, respectively. For example, an air conditioner 1 is configured as the controller for controlling the illuminating lamp and the curtain, an air conditioner 2 is configured as the controller for controlling the refrigerator and the electric rice cooker, and an air conditioner 3 is configured as the controller for controlling other smart devices.

In addition, it is to be further noted that when the first device is taken as the controller, the first device still retain a former function. For example, the air conditioner is not only taken as the controller for sending or forwarding at least one control instruction to the other smart devices, and but also adjusts a temperature, humidity and the like of an area where the air conditioner is located.

In an optional embodiment, the user selects the first device from the multiple devices and determines the first device as the controller through the user terminal. For example, the air conditioner is selected as the controller, and the instruction is sent to the air conditioner to configure the air conditioner as the controller. The first device set as the controller has a radio communication component, for example, a Wireless Fidelity (WIFI) component and a Radio Frequency (RF) component. The WIFI component completes remote communication between the user terminal and the first device, and the RF component completes communication between the first device and other devices.

Through the Step S102, any device of the smart devices is taken as the controller, and the first device set as the controller is configured to control the other smart devices, without adopting an additional controller to control the smart devices. In this way, integration of the smart devices is achieved, and using cost of the smart devices used by the user is reduced.

At Step S104, the user terminal selects a second device from the multiple devices and associates the second device with the controller to acquire an association relationship.

It is to be noted that multiple kinds of the abovementioned second devices may be taken, for example, the second devices include two refrigerators, one electric rice cooker, three curtains, nine illuminating lamps and the like.

Specifically, the user terminal detects whether the first device and the user terminal are located within an identical local area network. When determining that the user terminal and the first device located within the identical local area network, and the user determines the first device as the controller, for example, the user configures the air conditioner as the controller, the user terminal sends a selection instruction to the first device, the first device sends feedback to the user terminal, and the user terminal determines the first device as the controller according to the feedback. The user associates the controller with the second device through the user terminal. For one example, the user terminal associates the first device with the second device through a Radio Frequency (RF) infrared component of the first device and an infrared component of the second device. For another example, the user terminal associates the air conditioner as the controller with the curtain and the illuminating lamp. After association, the user terminal controls the curtain, the illumination lamp and the like through the air conditioner.

It is to be noted that when the user terminal and the first device are not located within the identical local area network, the user terminal sends the selection instruction to the first device through a server after determining the first device as the controller. The first device, after receiving the control instruction through the WIFI component, sends the feedback to the user terminal through the server to complete connection between the user terminal and the first device. After determining the first device as the controller, the user configures the association relationship between the second device and the controller through the user terminal, and sends the association relationship to the first device through the server. The first device completes connection between the first device and the second device through the RF infrared component according to the received association relationship.

At Step S106, the user terminal sends the control instruction to the first device, so as to make the first device control, according to the association relationship, the second device to complete an operation corresponding to the control instruction.

In an optional embodiment, after determining the first device as the controller and the second device to be controlled by the first device, the user controls the smart device through the user terminal. For example, the user sends the control instruction to the air conditioner set as the controller through clicking a control for sending the control instruction on a display interface of the user terminal. After receiving the control instruction, the air conditioner controls a device associated with the air conditioner according to the control instruction, so as to make other smart devices complete the operation corresponding to the control instruction.

Based on the solution from the abovementioned Step S102 to the abovementioned Step S106, it may be learned that the user terminal selects the first device from the multiple devices, determines the first device as the controller, selects the second device from the multiple devices, associates the second device with the controller to acquire the association relationship, and then sends the control instruction to the first device, so as to make the first device control, according to the association relationship, the second device to complete the operation corresponding to the control instruction.

It is seen from the above description that the device set as the controller is determined from the multiple devices to be controlled, and a selected device controls the other devices. Therefore, when the user controls the multiple devices, the additional controller is no longer to be configured, thereby achieving the integration of the smart devices accordingly.

From the abovementioned contents, the abovementioned embodiment may achieve the purpose of saving cost of mounting the smart device, in this way the technical effect of the integration of the smart devices is achieved, and accordingly the technical problem that the integration of the smart devices does not be achieved since an additional device is to be taken as a control center to control the multiple smart devices is solved.

Figure 2:
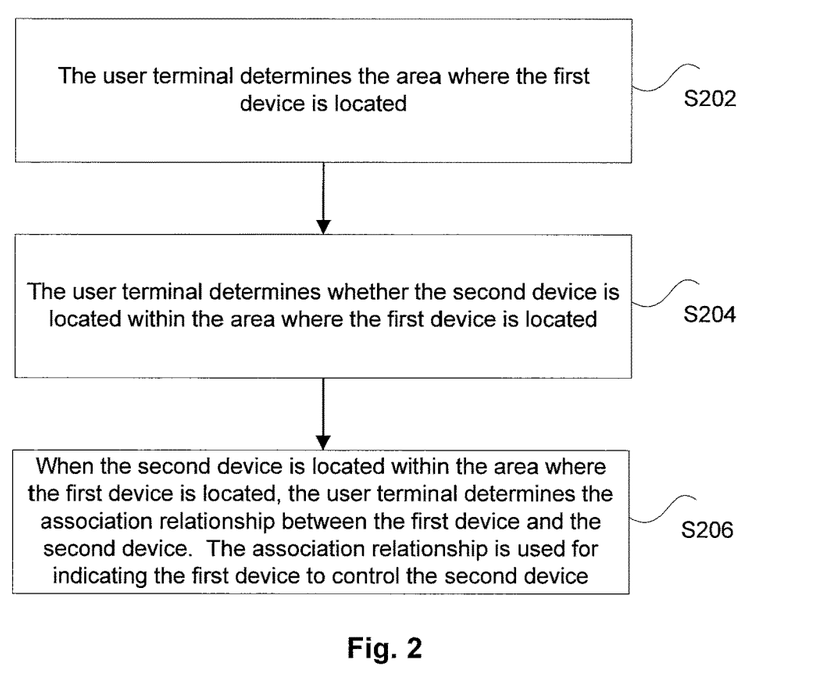
FIG. 2 is a flowchart of a method for controlling a device according to an optional embodiment of the present disclosure.

It is to be noted that the RF infrared component implements short-distance communication. Therefore, the controller located in a first area does not control the smart device located in a second area. For example, the air conditioner set for a master bedroom does not control the curtain and the illuminating lamp set at a second bedroom. Thus, in order to ensure that the controller controls the smart devices within the multiple areas, the corresponding controllers are configured according to the smart devices of the different areas. FIG. 2 shows a flowchart of a method for controlling a device according to an optional embodiment of the present disclosure. As shown in FIG. 2, the step that the second device is associated with the controller to acquire the association relationship includes the following steps.

At Step S202, the user terminal determines the area where the first device is located.

At Step S204, the user terminal determines whether the second device is located within the area where the first device is located.

At Step S206, when the second device is located within the area where the first device is located, the user terminal determines the association relationship between the first device and the second device. The association relationship is used for indicating the first device to control the second device.

Specifically, the user determines the controllers of the different areas through the user terminal. For example, the air conditioners of a living room, the master room and the second room are respectively configured as the controllers of the living room, the master room and the second room. After determining the controllers of the different areas, the user terminal determines whether the second device is located within the area where the first device is located according to a distance between the second device and the first device. For example, when the distance between the second device and the first device is less than a preset threshold, the user terminal determines that the second device is located within the area where the first device is located. In addition, a machine learning mode is further used for determining whether the second device is located within the area where the first device is located. For example, through collecting image information of the area where the second device is located and analyzing the image information, it is determined, according to an analyzing result, whether the second device is located within the area where the first device is located is determined. After determining that the second device is located within the area where the first device is located, the user terminal associates the second device located in the area where the first device is located with the first device, so as to make the controller control the smart devices located within an identical area.

In an optional embodiment, the step of determining whether the second device is located within the area where the first device is located through the machine learning mode specifically includes the following steps.

At Step S204a, the first device acquires the image information of the area where the second device is located.

At Step S204b, the first device analyzes the image information with a preset model and determines area information of the area where the second device is located according to the image information. The preset model is trained with multiple groups of data through machine learning. Each group of data in the multiple groups of data includes a background image of the second device and the area information contained in the background image.

At Step S204c, the first device sends the area information of the area where the second device is located. The user terminal determines whether the second device is located within the area where the first device is located according to the area information of the area where the second device is located and the area where the first device is located.

Specifically, an image collecting apparatus (for example, a camera), which acquires the image information of the area where the second device is located, is mounted on the second device. The second device sends the image information of the area where the second device is located to the first device through the RF infrared component, and the first device takes the image information as an input of the preset model to determine the area information of the area where the second device is located. After acquiring the area information of the area where the second device is located, the first device sends the area information of the area where the second device is located to the user terminal. And the user terminal matches the area information of the area where the second device is located with the area information of the area where the first device is located to obtain a matching result, and determines whether the second device is located within the area where the first device is located according to the matching result.

It is to be noted that the image information of the area where the abovementioned second device is located is an environmental image of the area where the second device is located, for example, an image of a fixed device (for example, a sofa, a potted plant) within the area where the second device is located. When the image information of the area where the second device is located is acquired, the image information of the area where the second device is located is analyzed by making use of the preset model trained through machine learning in advance to determine the area information of the area where the second device is located, for example, to determine whether the second device is located within the living room according to the image information. For acquiring the corresponding area information of the area where the second device is located, a neural network model is established, multiple groups of background images of the area where the second device is located are acquired in advance, and each group of the background images is provided with corresponding labels through an artificial labeling mode to acquire the area information contained in the background image. Then the neural network model is trained with the configured area information to acquire the preset model.

In an optional embodiment, after associating the first device with the second device, the user terminal controls the second device through the first device. The step that the user terminal sends the control instruction to the first device, so as to make the first device control, according to the association relationship, the second device to complete the operation corresponding to the control instruction specifically includes the following steps.

At Step S106a, the user terminal determines whether the user terminal and the first device are located within the identical local area network.

At Step S106b, when the user terminal and the first device are located within the identical local area network, the user terminal sends the control instruction to the first device. The first device sends the control instruction to the second device, so as to make the second device complete the operation corresponding to the control instruction.

At Step S106c, when the user terminal and the first device are not located within the identical local area network, the user terminal sends the control instruction to the server. The server sends the control instruction to the first device, so as to make the first device send the control instruction to the second device.

It is to be noted that when the first device (namely, the controller) and the user terminal are located within the identical local area network, the user terminal directly sends the control instruction to the controller to control a device associated with the controller. When the local area network where the controller is located is different from the local area network where the user terminal is located, the user terminal is not in direct communication with the controller. At the moment, the user terminal sends the control instruction to the server, the server forwards the control instruction to the controller, and the controller converts the control instruction received through the WIFI component to a control instruction to be processed by the RF infrared component, and send the converted control instruction to the smart device associated with the controller through a User Datagram Protocol (UDP).

In an optional embodiment, after sending the control instruction to the second device, the controller determines whether to control the second device according to the feedback of the second device, and the specific method includes the following steps.

At Step S108, the first device determines whether the feedback sent by the second device is received within a preset time period.

At Step S110, when the feedback is not received within the preset time period, the first device determines that the control instruction is not successfully sent to the second device.

At Step S112, when times of failing to send the control instruction achieve preset times, the first device determines that the second device is offline and sends a prompt message to the user terminal.

Specifically, after the controller sends the control instruction to the corresponding second device, and when the second device receives the control instruction, the second device sends the feedback to the controller. When the controller fails to receive the feedback sent by the second device with the preset time period, it shows that the communication between the controller and the second device is not successfully established. At the moment, the controller sends the control instruction to the second device again. When the controller sends the control instruction to the second device continuously for three times, and fails to receive the feedback sent by the second device, the controller determines that the second device is offline. At the moment, the controller sends an offline message to the user terminal to prompt the user to connect the controller with the second device again.

It is to be noted that the preset times and the preset time period are set by the user. The preset time period is set to 10 s. The preset times are set to 3 times.

Figure 3:
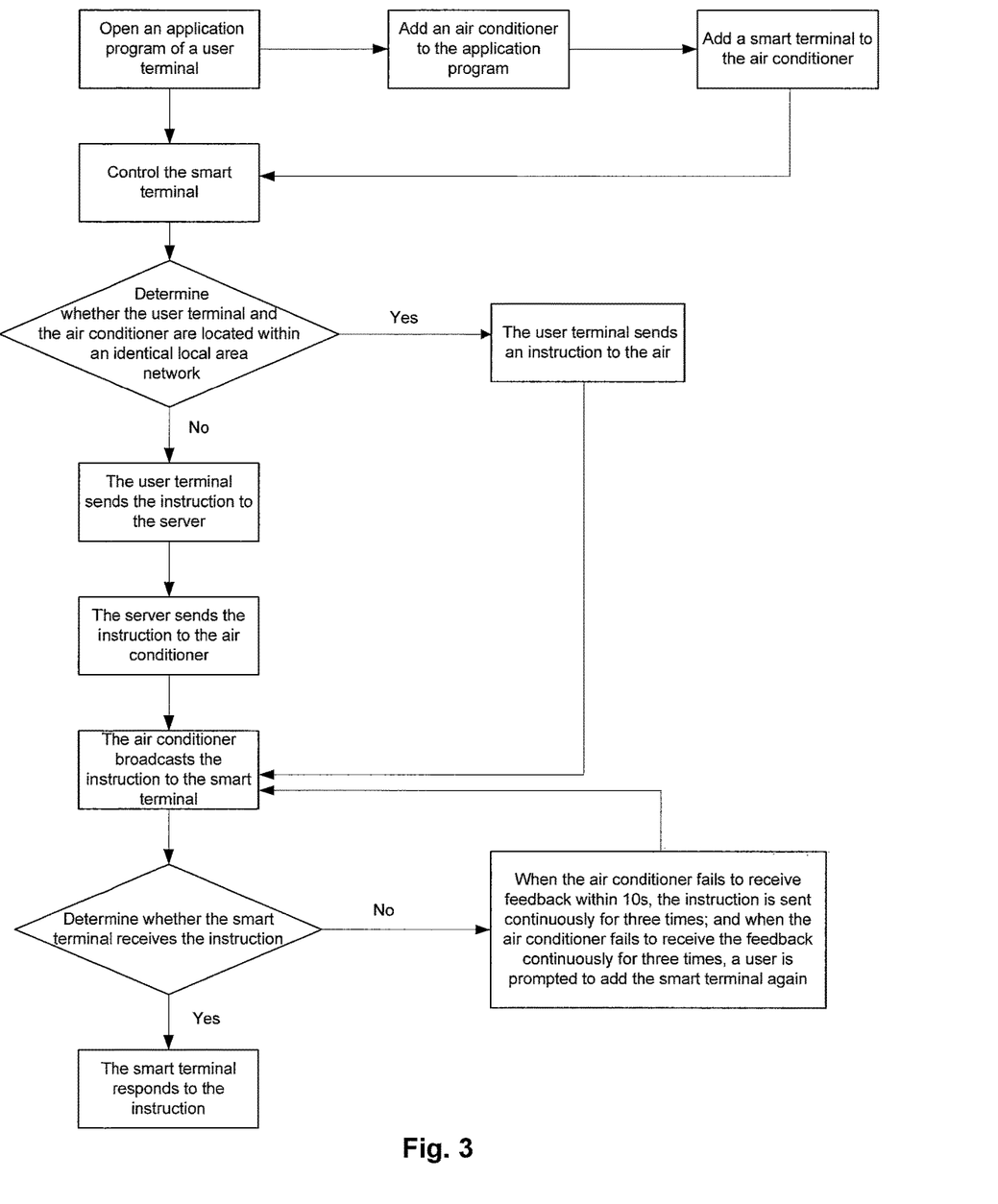
FIG. 3 is a flowchart of a method for controlling a device according to another optional embodiment of the present disclosure.

In an optional embodiment, FIG. 3 shows a flowchart of a method for controlling a device according to another embodiment of the present disclosure. As shown in FIG. 3, the controller is the air conditioner. Specifically, an application program capable for controlling the smart device (namely, a smart terminal shown in FIG. 3) is mounted on the user terminal, and the user opens the application program of the user terminal and add the air conditioner to the application program, so as to make the air conditioner be taken as the controller for controlling the smart terminal. After determining the air conditioner as the controller, the smart terminal is added to the air conditioner, so as to make the air conditioner control the smart terminal. After opening the application program of the user terminal, the user controls the smart terminal through the user terminal. First, the user terminal determines whether the user terminal and the air conditioner are located within the identical local area network. The user terminal sends the control instruction to the air conditioner directly when the user terminal and the air conditioner are located within the identical local area network. The user terminal sends the control instruction to the server first when the user terminal and the air conditioner are located within different local area networks, and the server sends the control instruction to the air conditioner. Upon receiving the control instruction, the air conditioner broadcasts the control instruction to the smart terminal associated with the air conditioner in a form of broadcasting. The air conditioner determines whether the smart terminal receives the control instruction through determining whether the feedback returned by the smart terminal is received. When determining that the smart terminal receives the control instruction, the smart terminal responds to the control instruction and completes the operation corresponding to the control instruction. When the air conditioner fails to receive the feedback sent by the smart terminal within 10 s, the control instruction is sent to the smart terminal continuously. When the air conditioner sends the control instruction continuously for three times and fails to receive the feedback returned by the smart terminal, the air conditioner sends the prompt message to the user terminal to prompt the user to adjust the smart terminal again.

Figure 4A:
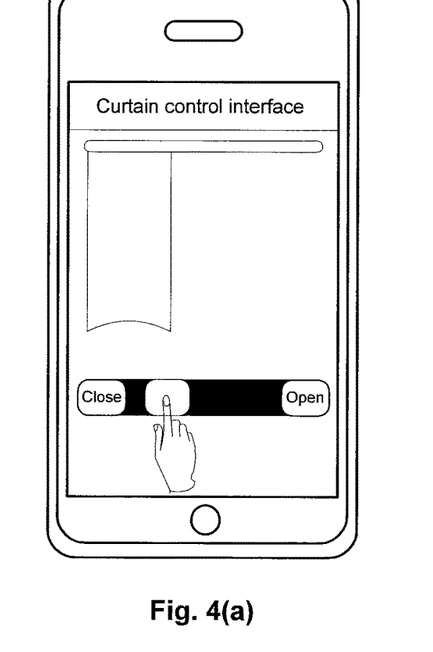
FIG. 4(a) is a display schematic diagram of a curtain control interface according to an optional embodiment of the present disclosure.

In an optional embodiment, after opening the present disclosure program on the user terminal, the user opens a curtain control interface through clicking a curtain icon in the application program, namely, a display schematic diagram of an optional curtain control interface shown in FIG. 4(a). The control interface for controlling the curtain includes two buttons and a slide control, and the two buttons open and close the curtain respectively. The user clicks the button "Open" to open the curtain. The user clicks the button "Close" to close the curtain. The user operates the slide control to control opening amplitude of the curtain. The opening amplitude of the curtain is increased or reduced for 20% for every operation of the slide control. In addition, the opening amplitude of the curtain is reduced or increased for 20% when the user clicks the button "Open" or "Close" every time. After determining the opening amplitude of the curtain, the user terminal sends the control instruction including the opening amplitude of the curtain to the air conditioner, and the air conditioner controls the opening amplitude of the curtain.

Figure 4B:
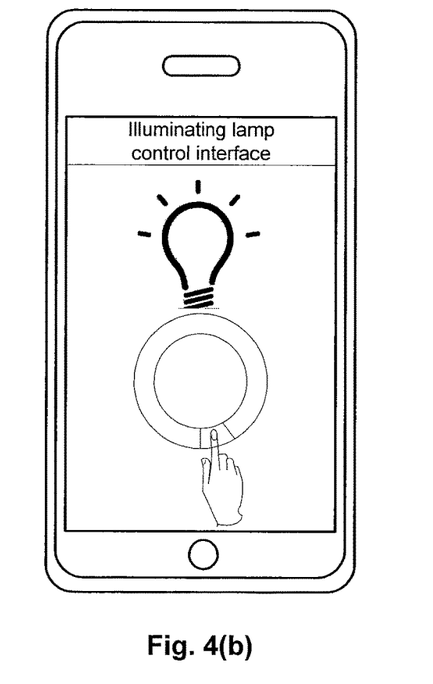
FIG. 4(b) is a display schematic diagram of an illuminating lamp control interface according to an optional embodiment of the present disclosure.

In another optional embodiment, after opening the present disclosure program on the user terminal, the controller opens an illuminating lamp control interface through clicking an illuminating lamp icon in the application program, namely, a display schematic diagram of an optional illuminating lamp control interface shown in FIG. 4(b). As shown in FIG. 4(b), the control interface includes a clock-type sliding disk, and brightness of a bulb is controlled by sliding a sliding block on the sliding disk. Opening brightness of the bulb is 100% by default. When the user slides the sliding block on the sliding disk, a length of the sliding block is changed, while the brightness of the bulb is related to a percentage of the length of the sliding block in a length of the whole sliding disk. After determining the brightness of the illuminating lamp, the user terminal sends the control instruction including the brightness of the illuminating lamp to the air conditioner, and the air conditioner controls the brightness of the illuminating lamp.

Figure 4C:
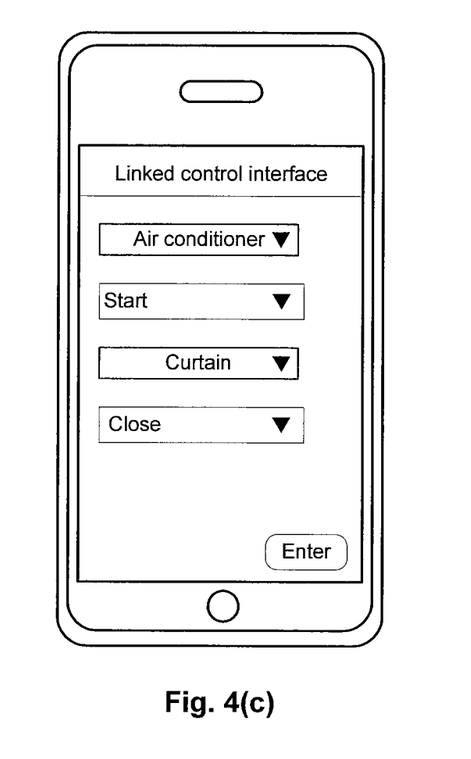
FIG. 4(c) is a display schematic diagram of a linked control interface according to an optional embodiment of the present disclosure.

There is still another optional embodiment, after opening the application program on the user terminal, the user opens a linked control interface by clicking an icon for controlling linkage with a device in the application program, namely, a display schematic diagram of an optional linked control interface shown in FIG. 4(c). As shown in FIG. 4(c), on the control interface, the user sets the smart device to be linked and sets a running status of the smart device, for example, set starting of the air conditioner and closing of the curtain, and click the button "Enter", to complete setting of the device needing to be linked. After determining the smart device to be linked and the running status of the smart device, the user terminal sends the control instruction including labeling information of the smart device to be linked and the running status of the smart device to the air conditioner, and the air conditioner controls the linkage of the smart device.

Embodiment Two

Figure 5:
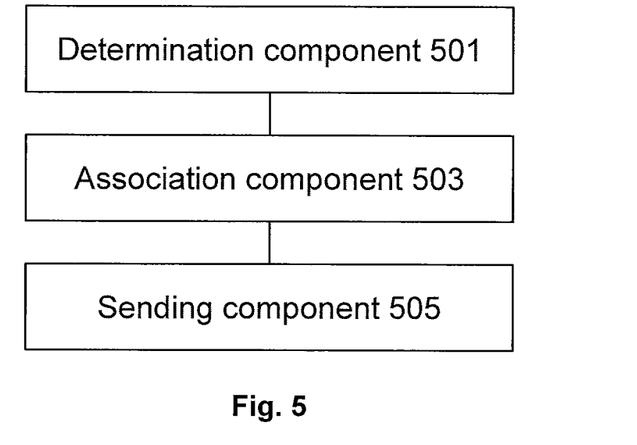
FIG. 5 is a structural schematic diagram of an apparatus for controlling a device according to an embodiment of the present disclosure.

In another embodiment of the present disclosure, an apparatus embodiment for controlling a device is further provided. FIG. 5 is a structural schematic diagram of an apparatus for controlling a device according to an embodiment of the present disclosure. As shown in FIG. 5, the apparatus includes a determination component 501, an association component 503 and a sending component 505.

The determination component 501 is configured to select a first device from multiple devices and determine the first device as a controller. The association component 503 is configured to select a second device from multiple devices and associate the second device with the controller to acquire an association relationship. The sending component 505 is configured to send a control instruction to the first device, so as to make the first device control, according to the association relationship, the second device to complete an operation corresponding to the control instruction.

It is to be noted that the abovementioned determination component 501, the abovementioned association component 503 and the abovementioned sending component 505 correspond to Step S102 to the Step S106 in the embodiment one, examples and application scenes achieved by the three components and the corresponding steps are identical, but are not limited to contents disclosed by the abovementioned embodiment one.

In an optional embodiment, the association component includes: a first determination component, a second determination component and a third determination component. The first determination component is configured to determine an area where the first device is located. The second determination component is configured to determine whether the second device is located within the area where the first device is located. The third determination component is configured to, when the second device is located within the area where the first device is located determine an association relationship between the first device and the second device. The association relationship is used for indicating the first device to control the second device.

It is to be noted that the abovementioned first determination component, the abovementioned second determination component and the abovementioned third determination component correspond to the Step S202, to the Step S206 in the embodiment one, examples and application scenes achieved by the three components and the corresponding steps are identical, but are not limited to the contents disclosed by the abovementioned embodiment one.

In an optional embodiment, the first device includes an acquisition component, a fourth determination component and a first sending component. The acquisition component is configured to acquire image information of an area where the second device is located. The fourth determination component is configured to analyze the image information with a preset model and determine the area information of the area where the second device is located according to the image information. The preset model is trained with multiple groups of data through machine learning, and each group of data in the multiple groups of data includes a background image of the second device and the area information contained in the background image. And the first sending component is configured to send the area information of the area where the second device is located to the user terminal.

The second determination component is further configured to determine whether the second device is located within the area where the first device is located according to the area information of the area where the second device is located and the area where the first device is located.

It is to be noted that the abovementioned acquisition component, the abovementioned fourth determination component and the abovementioned first sending component correspond to the Step S204a to the Step S204c in the embodiment one, examples and application scenes achieved by the three components and the corresponding steps are identical, but are not limited to the contents disclosed by the abovementioned embodiment one.

In an optional embodiment, the sending component includes a fifth determination component, a second sending component and a third sending component. The fifth determination component is configured to determine whether the user terminal and the first device are located within an identical local area network. The second sending component is configured to, when the user terminal and the first device are located within the identical local area network send the control instruction to the first device. The first device sends the control instruction to the second device, so as to make the second device complete the operation corresponding to the control instruction. And the third sending component is configured to send the control instruction to the server. The server sends the control instruction to the first device, so as to make the first device send the control instruction to the second device.

It is to be noted that the abovementioned fifth determination component, the abovementioned second sending component and the abovementioned third sending component correspond to the Step S106a, the Step S106b and the Step S106c in the embodiment one, examples and application scenes achieved by the three components and the corresponding steps are identical, but are not limited to the contents disclosed by the abovementioned embodiment one.

In an optional embodiment, the first device further includes a sixth determination component, a seventh determination component and an eighth determination component. The sixth determination component is configured to determine whether the feedback sent by the second device is received within the preset time period. The seventh determination component is configured to, when the feedback is not received within the preset time period determine that the control instruction is not successfully sent to the second device. And the eighth determination component is configured to, when times of failing to send the control instruction achieve the preset times determine that the second device is offline and send a prompt message to the user terminal.

It is to be noted that the abovementioned sixth determination component, the abovementioned seventh determination component and the abovementioned eighth determination component correspond to the Step S108 to the Step S112 in the embodiment one, examples and application scenes achieved by the three components and the corresponding steps are identical, but are not limited to the contents disclosed by the abovementioned embodiment one.

Embodiment Three

Figure 6:
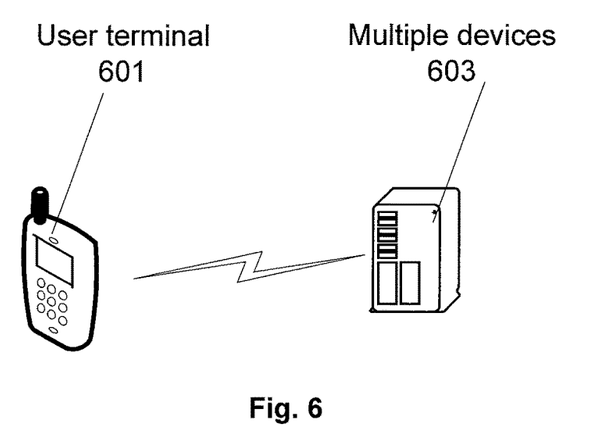
FIG. 6 is a structural schematic diagram of a system for controlling a device according to an embodiment of the present disclosure.

In another embodiment of the present disclosure, a system for controlling a device is further provided. FIG. 6 is a structural schematic diagram of a system for controlling a device according to an embodiment of the present disclosure. As shown in FIG. 6, the system includes a user terminal 601 and multiple devices 603 (FIG. 6 shows one device).

The user terminal 601 is in communication with the multiple devices and configured to select a first device from the plurality of devices, determine the first device as a controller, select a second device from the plurality of devices and associate the second device with the controller to acquire an association relationship, and send a control instruction to the first device, so as to make the first device controls the second device according to the association relationship to complete an operation corresponding to the control instruction.

Figure 7:
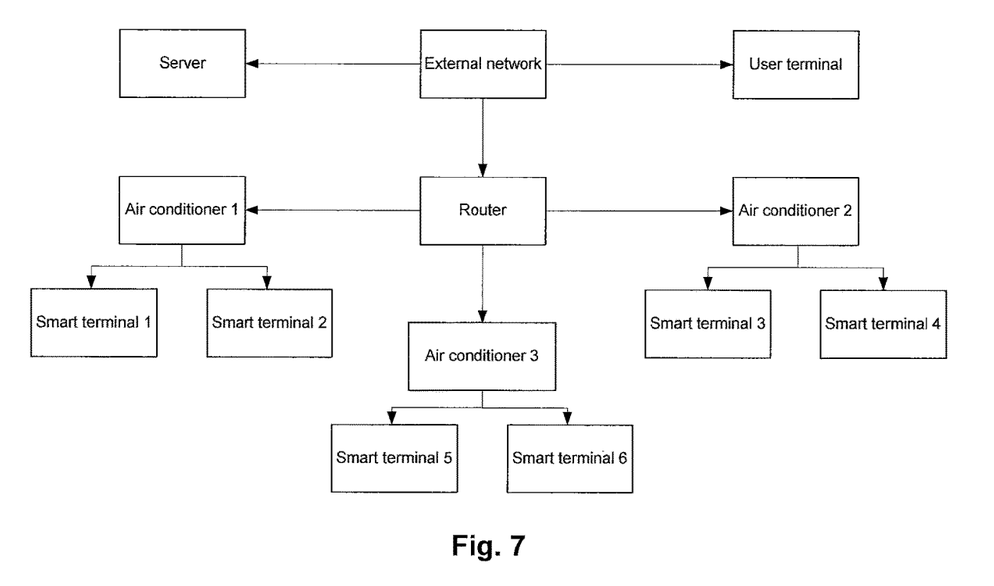
FIG. 7 is a structural schematic diagram of a system for controlling a device according to an optional embodiment of the present disclosure.

In an optional embodiment, FIG. 7 is a structural diagram of a system for controlling a device according to an optional embodiment of the present disclosure. As shown in FIG. 7, the system for controlling the device includes the user terminal and the multiple devices (namely a smart terminal 1, a smart terminal 2, a smart terminal 3, a smart terminal 4, a smart terminal 5, a smart terminal 6, an air conditioner 1, an air conditioner 2, an air conditioner 3 as shown in FIG. 7), as well as a router and a server. The server is in communication with the user terminal and the first device, and configured to, when the first device and the user terminal are not located in an identical local area network, receive the control instruction sent by the user terminal and send the control instruction to the first device, so as to make the first device control, according to the association relationship, the second device to complete the operation corresponding to the control instruction. And the router is connected with the user terminal, the server and the first device and configured to, when the first device and the user terminal are not located within the identical local area network, to forward the control instruction to the first device.

It is to be noted that the air conditioner 1, the air conditioner 2 and the air conditioner 3 are taken as the controllers. Specifically the air conditioner 1 controls the smart terminal 1 and the smart terminal 2, the air conditioner 2 controls the smart terminal 3 and the smart terminal 4, and the air conditioner 3 controls the smart terminal 5 and the smart terminal 6. The router is connected with an external network. When the user terminal and the controller are not located within the identical local area network, the router receives the control instruction, which is forwarded by the user terminal, through the server, and distribute the control instruction to the controller in a form of broadcasting, and the controller controls the smart terminal to complete the operation corresponding to the control instruction.

In addition, it is to be further noted that a Wireless Fidelity (WIFI) component and a Radio Frequency (RF) component are mounted on the controller. When the controller and the user terminal are not located within the identical local area network, the controller receives the control instruction sent by the user terminal through the WIFI component, and forwards the control instruction to the smart terminal through the RF component.

From the foregoing, the user terminal which is in communication connection with the multiple devices, selects a first device from the plurality of devices, determine the first device as a controller, select a second device from the plurality of devices and associate the second device with the controller to acquire an association relationship, and send a control instruction to the first device, so as to make the first device control, according to the association relationship, the second device to complete an operation corresponding to the control instruction.

It is seen from the above description that the device which is taken as the controller is selected from the multiple devices to be controlled, and the selected device controls other devices. Therefore, when the user controls the multiple devices, the additional controller is no longer to be configured, thereby achieving integration of the smart devices accordingly.

From the abovementioned contents, the abovementioned embodiment achieves a purpose of saving cost of mounting the smart device is achieved, in this way, a technical effect of the integration of the smart device is achieved, and accordingly the technical problem that the integration of the smart devices does not be achieved since the additional controller is taken as the control center to control the multiple smart devices is solved.

In an optional embodiment, the user terminal further determines the area where the first device is located, determines whether the second device is located within the area where the first device is located, when the second device is located within the area where the first device is located, determines the association relationship between the first device and the second device. The association relationship is used for indicating the first device to control the second device.

In an optional embodiment, the user terminal further determines whether the user terminal and the first device are located within the identical local area network. When the user terminal and the first device are located within the identical local area network, the user terminal sends the control instruction to the first device. The first device sends the control instruction to the second device, so as to make the second device complete the operation corresponding to the control instruction.

In an optional embodiment, the user terminal further sends the control instruction to the server. The server sends the control instruction to the first device, so as to make the first device send the control instruction to the second device.

In an optional embodiment, the first device, selected from the multiple devices, further acquires the image information of the area where the second device is located, analyze the image information with a preset model and determine the area information of the area where the second device is located according to the image information. The preset model is trained with multiple groups of data through machine learning, and each group of data in the multiple groups of data includes a background image of the second device and the area information contained in the background image. And the first device sends the area information of the area where the second device is located to the user terminal. The user terminal determines whether the second device is located within the area where the first device is located according to the area information of the area where the second device is located and the area where the first device is located.

In an optional embodiment, the first device, selected from the multiple devices, further determines whether feedback sent by the second device is received within the preset time period. When the feedback is not received within the preset time period, the first device determines that the control instruction is not successfully sent to the second device, and when times of failing to send the control instruction achieve preset times, determine that the second device is offline and send a prompt message to the user terminal.

Embodiment Four

In another embodiment of the present disclosure, a storage medium is further provided. The storage medium may include a stored program. The stored program implements the method for controlling the device in the embodiment one.

Embodiment Five

In another embodiment of the present disclosure, a processor is further provided. The processor is configured to run a program. The program implements the method for controlling the device in the embodiment one when running.

The sequence numbers of the embodiments of the abovementioned present disclosure are for description and do not represent the advantages and disadvantages of the embodiments.

In the abovementioned embodiments of the present disclosure, descriptions of all embodiments are emphasized respectively, and parts which are not elaborated in detail in a certain embodiment may refer to relevant descriptions of other embodiments.

In several embodiments provided by the present disclosure, it is to be understood that the disclosed technical contents may be achieved in other manners. Herein, the apparatus embodiments described above are merely illustrative. For example, the division of the element may be a logical function division. In actual implementation, there may be another division manner, for example, multiple elements or components may be combined or integrated into another system, or some features may be ignored or not executed. In addition, coupling or direct coupling or communication connection displayed or discussed may be indirect coupling or communication connection between the elements or components through some interfaces, and may be electrical or otherwise.

The elements described as separate components may or may not be physically separated, and the components displayed as the elements may or may not be physical elements, that is, may be located in one place, or may be distributed to multiple elements. Some or all of the elements may be selected according to actual need to achieve the purpose of the solution of the present embodiment.

In addition, each functional element in the each embodiment of the present disclosure may be integrated into one processing element, or each element may exist physically separately, or two or more elements may be integrated into one element. The integrated element may be achieved in a form of hardware or in a form of software functional element.

The integrated element may be stored in a computer-readable storage medium if being achieved in the form of the software function element and sold or used as a standalone product. Based on such understanding, the essence of the technical solution of the present disclosure or a part contributing to the conventional art or all or part of the technical solution may be embodied in the form of a software product that is stored in a storage medium, including multiple instructions used to cause a computer device (which may be a personal computer, a server, or a network device and the like) to implement all or part of the steps of the method described in various embodiments of the present disclosure. The abovementioned storage medium includes: various media capable of storing a program code, such as a U disk, a Read-Only Memory (ROM), a Random Access Memory (RAM), a mobile hard disk, a magnetic disk or an optical disc.

The above are exemplary embodiments of the present disclosure. It should be pointed out that those of ordinary skill in the art may also make some improvements and modifications without departing from the principle of the present disclosure, and these improvements and modifications should fall within the scope of protection of the present disclosure.

INDUSTRIAL APPLICABILITY

The solution provided by at least some embodiments of the present disclosure is applied to a control process of a smart home. The user terminal selects the first device from the multiple devices, determines the first device as the controller, selects the second device from the multiple devices, associates the second device with the controller to acquire the association relationship, and sends the control instruction to the first device, so as to make the first device control, according to the association relationship, the second device to complete the operation corresponding to the control instruction. Since the device set as the controller is selected from the multiple devices to be controlled, and the selected device controls other devices, the additional controller is no longer to be configured when a user wants to control the multiple devices, in this way integration of smart devices is achieved, and accordingly the technical problem that the integration of the smart devices does not be achieved since the additional controller is taken as the control center to control the multiple smart devices is solved.

What is claimed is:

1. A method for controlling a device, comprising:
    selecting, by a user terminal, a first device from a plurality of devices and determining, by a user terminal, the first device as a controller;
    selecting, by the user terminal, a second device from the plurality of devices and associating, by the user terminal, the second device with the controller to acquire an association relationship; and
    sending, by the user terminal, a control instruction to the first device, so as to make the first device control, according to the association relationship, the second device to complete an operation corresponding to the control instruction;
    wherein the method further comprises:
    determining, by the user terminal, an area where the first device is located;
    determining, by the user terminal, whether the second device is located within the area where the first device is located;
    wherein determining, by the user terminal whether the second device is located within the area where the first device is located comprises:
    acquiring, by the first device, image information of an area where the second device is located; analyzing, by the first device, the image information with a preset model, and determining area information of the area where the second device is located according to the image information, wherein the preset model is trained with a plurality of groups of data through machine learning, and each group of data in the plurality of groups of data comprises: a background image of the second device and the area information contained in the background image; and sending, by the first device, the area information of the area where the second device is located to the user terminal, so that the user terminal determines whether the second device is located in the area where the first device is located according to the area information of the area where the second device is located and the area where the first device is located.

2. The method as claimed in claim 1, wherein associating, by the user terminal, the second device with the controller to acquire the association relationship comprises:
    when the second device is located within the area where the first device is located, determining, by the user terminal, the association relationship between the first device and the second device, wherein the association relationship is used for indicating the first device to control the second device.

3. The method as claimed in claim 1, wherein sending, by the user terminal, the control instruction to the first device, so as to make the first device control, according to the association relationship, the second device to complete the operation corresponding to the control instruction comprises:
    determining, by the user terminal, whether the user terminal and the first device are located within an identical local area network;
    when the user terminal and the first device are located within the identical local area network, sending, by the user terminal, the control instruction to the first device, so that the first device sends the control instruction to the second device, so as to make the second device complete the operation corresponding to the control instruction.

4. The method as claimed in claim 3, wherein when the user terminal and the first device are not located within the identical local area network, the method further comprises:
    sending, by the user terminal, the control instruction to a server, so that the server sends the control instruction to the first device, so as to make the first device send the control instruction to the second device.

5. The method as claimed in claim 3, wherein the method further comprises:
    determining, by the first device, whether feedback sent by the second device is received within a preset time period;
    determining, by the first device, when the feedback is not received within the preset time period, that the control instruction is not successfully sent to the second device; and
    when times of failing to send the control instruction achieve preset times, determining, by the first device, that the second device is offline, and sending, by the first device, a prompt message to the user terminal.

6. An apparatus for controlling a device, comprising: a hardware processor coupled with a memory and configured to execute program instructions stored on the memory, wherein the program instructions comprise:
    selecting a first device from a plurality of devices and determine the first device as a controller;
    selecting a second device from the plurality of devices and associate the second device with the controller to acquire an association relationship; and
    sending a control instruction to the first device, so as to make the first device control, according to the association relationship, the second device to complete an operation corresponding to the control instruction;
    wherein the program instructions further comprise:
    determining, by the user terminal, an area where the first device is located;
    determining, by the user terminal, whether the second device is located within the area where the first device is located;
    wherein determining, by the user terminal, whether the second device is located within the area where the first device is located comprises:

acquiring, by the first device, image information of an area where the second device is located; analyzing, by the first device, the image information with a preset model, and determining area information of the area where the second device is located according to the image information, wherein the preset model is trained with a plurality of groups of data through machine learning, and each group of data in the plurality of groups of data comprises: a background image of the second device and the area information contained in the background image; and sending, by the first device, the area information of the area where the second device is located to the user terminal, so that the user terminal determines whether the second device is located in the area where the first device is located according to the area information of the area where the second device is located and the area where the first device is located.

7. A system for controlling a device, comprising:

a plurality of devices;

a user terminal, which is in communication connection with the plurality of devices, and configured to select a first device from the plurality of devices, determine the first device as a controller, select a second device from the plurality of devices and associate the second device with the controller to acquire an association relationship, and send a control instruction to the first device, so as to make the first device controls the second device according to the association relationship to complete an operation corresponding to the control instruction;

wherein the user terminal is further configured to determine an area where the first device is located, and determine whether the second device is located within the area where the first device is located;

wherein the first device is configured to acquire image information of an area where the second device is located, analyze the image information with a preset model, and determine area information of the area where the second device is located according to the image information, wherein the preset model is trained with a plurality of groups of data through machine learning, and each group of data in the plurality of groups of data comprises: a background image of the second device and the area information contained in the background image; and send the area information of the area where the second device is located to the user terminal, so that the user terminal determines whether the second device is located in the area where the first device is located according to the area information of the area where the second device is located and the area where the first device is located.

8. The system as claimed in claim 7, wherein the system further comprises:

a server, which is in communication with the user terminal and the first device, and configured to, when the first device and the user terminal are not located in an identical local area network, receive the control instruction sent by the user terminal and send the control instruction to the first device, so as to make the first device control, according to the association relationship, the second device to complete the operation corresponding to the control instruction.

9. The system as claimed in claim 8, wherein the system further comprises:

a router, connected with the user terminal, the server and the first device, and configured to, when the first device and the user terminal are not located within the identical local area network, forward the control instruction to the first device.

10. A non-transitory storage medium, the storage medium comprising a stored program, wherein the stored program implements the method for controlling the device as claimed in claim 1.

11. A processor, the processor being configured to run a program, wherein the program implements the method for controlling the device as claimed in claim 1 when running.

* * * * *